No. 765,176. PATENTED JULY 19, 1904.
J. E. GILL.
LUBRICATING DEVICE.
APPLICATION FILED SEPT. 25, 1903.
NO MODEL.

Witnesses.
Inventor:
John E. Gill
By Raymond & Burnett
Attys

No. 765,176. Patented July 19, 1904.

UNITED STATES PATENT OFFICE.

JOHN EDWIN GILL, OF FRANKLIN, PENNSYLVANIA.

LUBRICATING DEVICE.

SPECIFICATION forming part of Letters Patent No. 765,176, dated July 19, 1904.

Application filed September 25, 1903. Serial No. 174,591. (No model.)

*To all whom it may concern:*

Be it known that I, JOHN EDWIN GILL, a citizen of the United States, residing at Franklin, in the county of Venango and State of Pennsylvania, have invented certain new and useful Improvements in Lubricating Devices, of which the following is a specification.

My invention relates in part to improvements in lubricating devices, such as are fully disclosed in my copending application, Serial No. 154,162.

The object of my invention is to combine the advantages of a solid and fluid when used as lubricant and also to combine them in such a manner that the operation of the parts to be lubricated shall serve to mix the different lubricating elements to a suitable and satisfactory lubricating compound.

A further object of my invention is to provide a cake of solid lubricant with means for at all times supplying to the lubricating-surface of said cake a suitable liquid whereby any friction between the lubricating-surface of the solid lubricant and the parts to be lubricated will be minimized.

These and such other objects as may hereinafter appear are attained by the devices shown in the accompanying drawings, in which—

Figure 1:
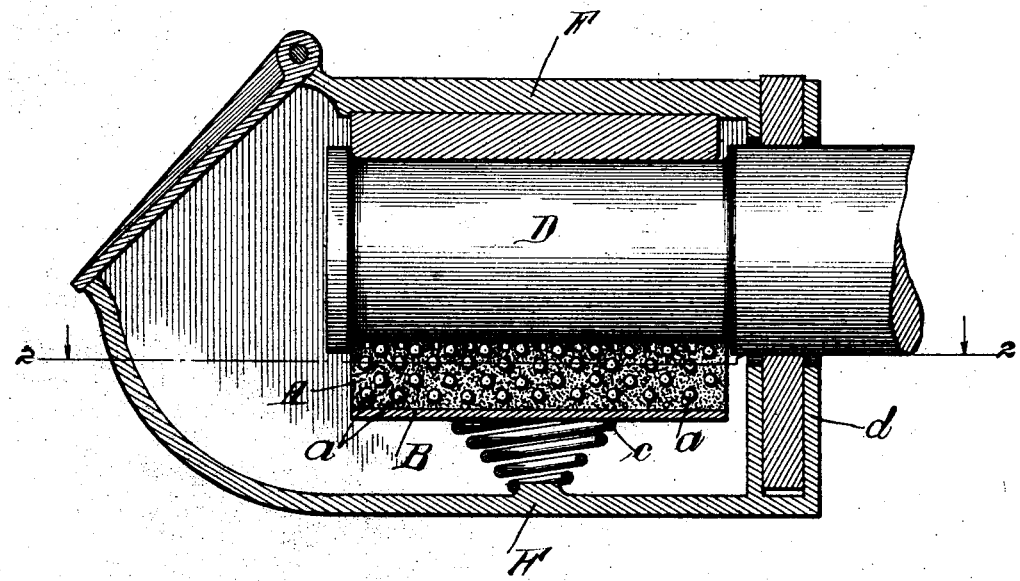
Figure 2:
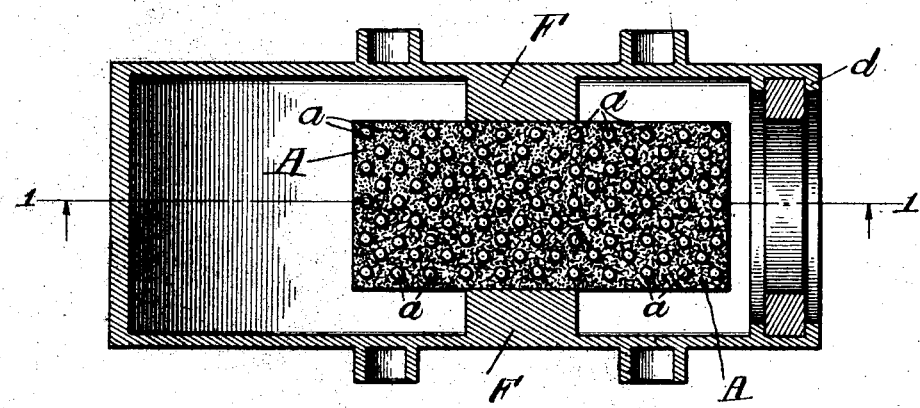

Figure 1 is longitudinal sectional view through a journal-box fitted with my improved lubricating device, and Fig. 2 is a horizontal sectional view on the line 2 2 of Fig. 1.

It is well known that although a fluid lubricant, such as oil, is one of the most satisfactory means for reducing friction; it is expensive not only because of the cost of the lubricant used, but because of the large amount thereof wasted, and it is often troublesome because of difficulty in obtaining a satisfactory feed thereof to the bearings to be lubricated. So, also, in some situations—such, for instance, as in the journal of an axle-box—the fluid lubricant, although it reduces friction, does not serve in any satisfactory manner to protect the bearing from contact with dust, cinders, or other foreign substances which tend to wear and heat the bearings. On the other hand, while a solid lubricant is desirable on the score of economy and of protection to the lubricated parts, as well as because of the ease with which it may be constantly fed thereto, the friction between a solid lubricant and a journal is appreciable and is often prohibitive—as, for instance, with machinery where a considerable number of journals are lubricated by means of cakes of solid lubricant. When the machinery is at rest and the solid lubricant, which has been softened by friction with the rotating journals, has hardened, the friction between the hardened lubricant and the plurality of journals is such as to at times prevent the starting of the machinery and is at all times such as to put an undesirable initial load upon the motive power. Again, it is desirable to apply different lubricants to different situations—as, for instance, castor-oil makes an ideal lubricant, but is difficult of application because its heavy body prohibits its being fed by capillary action. So, also, various compounds—such, for instance, as compounds of different oils and greases or compounds of oil with graphite, sulfur, lead compound, or other substances—would furnish ideal lubricant for certain situations; but with the case of oil mixed with graphite or similar substances the heavier ingredient is sure to be precipitated, and it is impossible to keep the compound in such a state of agitation as to provide a homogeneous lubricating compound at all times. Not only so, but with compounded lubricating substances the effect of light and temperature as a deteriorating influence is often noticeable. In order to overcome some of these objections, I provide a cake of solid lubricant A, which is mounted upon a plate or suitable support B and is pressed by the spring C against the journal D, the lower end of the spring C being mounted in the bottom of the journal-box F.

The cake of lubricant A is superficially provided with means for retaining a fluid, preferably oil, which will be smeared over the bearing-surface of the cake A by the rotation of the journal.

While in its simplest form the lubricating cake A may be of simple grease, my improvement permits of making this cake of a compound of, say, grease or graphite or other elements which it may be desirable to mix with a fluid element to make the desired lubricant for a given situation. By mixing graphite, sulfur, lead compound, or the like in the cake of grease and by supplying the superficial chambers with oil it will be observed that the rotation of the journal will not only mix the solid grease with the oil in the chambers, but will also wear off from the solid grease and mix with the oil portions of the graphite which are mixed in the cake of solid grease, the journal thereby making its own lubricating mixture. All this, however, is either shown or suggested by my copending application, previously referred to. With the structure shown in that application, however, the fluid element must be applied superficially to the cake of solid lubricant and would probably have to be renewed from time to time, as the tendency of the rotating journal would be to draw the fluid lubricant out of the fluid-receptacles more rapidly than it would wear the solid lubricant.

To avoid any necessity for renewal of the oil from time to time during the life of the cake of solid lubricant and to provide the fluid element in such quantities as may be needed, but without unduly wasting it, I provide the body of the cake of solid lubricant throughout with closed fluid-cells $a$, preferably arranged with staggered relation to each other and in such a manner that as the rotation of the journal wears off the surface of the cake of solid lubricant and wears down toward the bottom of the superficial oil or fluid receptacles it will also wear into and open successive layers of these fluid-receptacles disposed throughout the body of the solid lubricant, so that the fluid element will be supplied constantly and in regulated quantities as the journal wears through the cake of solid lubricant and will thus insure a steady supply of fluid lubricant to the bearing-surface of the solid lubricant until the same is worn out. Not only do I thereby attain the result above indicated, but obviously different cells may be filled with different lubricating elements, so that the rotation of the journal will not only serve to open the cells and supply a fluid to the bearing-surface of the solid lubricant, but the rotation of the journal will also serve to mix different lubricating elements together, thereby producing lubricating compound which is freshly compounded as it is consumed. It will thus be seen that I avoid any deterioration which may arise from the previous mixture of the lubricating elements and their subsequent exposure to varying conditions of light and temperature, while at the same time I provide means for obtaining practically any lubricating compound which may be desired.

Although I have referred to the cells $a$ as being provided throughout the body of the solid lubricant, and thereby have only suggested the simplest form—that is, recesses formed within the body of the solid lubricant— it is obvious that these cells of fluid lubricant may be readily provided by filling capsules of paraffin or of any other suitable material with the desired fluid and disposing these fluid-filled capsules throughout the body of the grease-cake when the same is formed. This embodiment of my invention would serve to protect the fluid contents of the various cells from contact with the body of the solid lubricant until the cells were broken into by the rotation of the journal and the contents were then mixed with the other lubricating elements. These, however, are mere details, the essential feature of this improvement being the provision of a body of solid lubricant with a plurality of fluid-filled cells.

While in the preceding parts of the specification I have pointed out some of the specific advantages of some specific forms embodying my invention, it will be seen that underlying all these specific forms and specific advantages is the broad invention of providing means whereby different elements suitable when mixed to form a lubricating compound may be kept separate from each other until the instant when the lubricating compound is required for the proper lubrication of the bearing-surface. At that time and not before these different elements, which have been supplied separately to a point adjacent to the surface to be lubricated, are caught up by the movement of the surface to be lubricated and are by the action of this moving part mixed together, so as to form a suitable compound for the lubrication of such part, which compound is formed only at the point where it is applied and required. Not only so, but this arrangement has some automatically-regulating features—as, for instance, if an oil be supplied which has not sufficient body for the surface required we will not only obtain from the revolution of the journal a mechanical mixture of the solid lubricant and such oil, but since such mixture is insufficient for the surface required some friction will result. Indeed, the heat generated by this friction will superficially melt the solid lubricant, thereby adding a greater proportion of it to the amount of oil and producing a lubricating compound having a heavier body, which will rapidly cool the journal to a point which will adjust itself where only sufficient heat will be generated by the journal to insure the requisite supply of softened or melted solid lubricant. This, however, is simply referred to as an emergency feature of my device, because generally when the service required of the lubricant is known in advance my device permits of such a proportioning of the different lubricating elements as will insure the production at the bearing-surface of the journal of just such a compound as will be required for the best lubrication of the journal.

It will be noted that my device may be so adapted that different elements—such as graphite, mica, sulfur, lead compound, &c.— which will not remain in suspension in a fluid lubricant may be mixed in with the body of the solid lubricant, and different receptacles in the solid lubricant may be filled with different lubricating elements, such as vaseline in some receptacles and oils having different bodies in others of the receptacles, and yet since each of these ingredients is kept separate from the others until put into service there will occur no such deterioration as might happen to a compound of these ingredients exposed to the influences of light, heat, gravity, chemical reaction, &c. When, however, the part to be lubricated begins to move, it effectively mixes all of these ingredients into the desired lubricating compound, which is applied and used at a time when freshly compounded.

I repeat that my invention discloses, broadly, means for accomplishing this result, although doubtless refinements of my invention may be devised for more effectively attaining these results under given conditions; but such variations or refinements of my invention would necessarily involve the use of my invention.

It is understood that I do not here claim the subject-matter of my coöpening application, Serial No. 154,162, in which application are shown and claimed some of the features of my invention, which are here disclosed but not claimed.

I claim—

1. As a new article of manufacture, a cake of solid lubricant containing throughout its body a plurality of closed fluid-containing cells.

2. As a new article of manufacture, a cake of solid lubricant having a plurality of closed fluid-containing cells embedded in its body.

3. As a new article of manufacture, a cake of solid lubricant containing a plurality of closed lubricant-containing cells.

4. As a new article of manufacture, a cake of solid lubricant containing a plurality of closed fluid-containing cells, some of said cells containing different fluids from those contained in others of said cells.

5. As a new article of manufacture, a cake of solid lubricant containing upon its bearing-surface means for containing a fluid, and containing within its body closed fluid-containing cells.

6. In a lubricating device, the combination with a part to be lubricated, of a cake of solid lubricant, provided on its upper face with means for containing a liquid and provided in its body with closed cells containing a fluid, and means for holding said cake of lubricant in contact with the part to be lubricated.

7. A lubricating device comprising a part to be lubricated, a solid lubricant provided with closed fluid-containing cells embedded therein, and means for holding said solid lubricant in contact with the part to be lubricated in such a manner that the operation of the part to be lubricated will open said fluid-cells as it wears away the solid lubricant.

JOHN EDWIN GILL.

Witnesses:
 THOMAS McGOUGH,
 THOMAS MATTHEWS.